No. 607,535. Patented July 19, 1898.
O. ANDERSON.
BEARING FOR VERTICAL SHAFTS.
(Application filed Sept. 30, 1897.)
(No Model.)
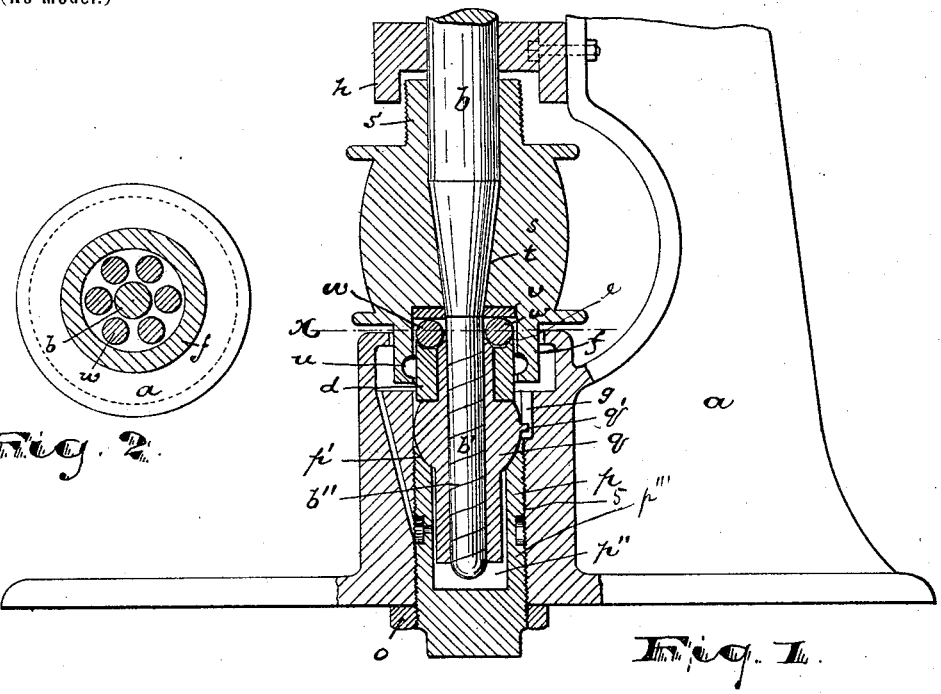
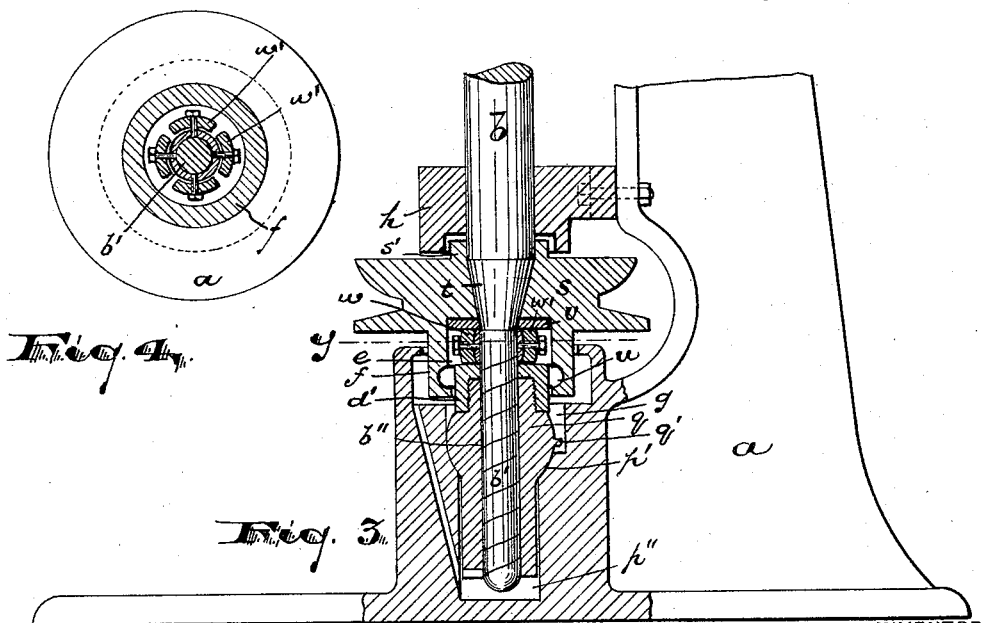
WITNESSES:
A. R. Krousse
O. B. Pitney
INVENTOR
Oscar Anderson,
BY Drake & Co.
ATTORNEYS

United States Patent Office.

OSCAR ANDERSON, OF NEWARK, NEW JERSEY.

BEARING FOR VERTICAL SHAFTS.

SPECIFICATION forming part of Letters Patent No. 607,535, dated July 19, 1898.

Application filed September 30, 1897. Serial No. 653,546. (No model.)

*To all whom it may concern:*

Be it known that I, OSCAR ANDERSON, a citizen of the United States, residing at Newark, in the county of Essex and State of New Jersey, have invented certain new and useful Improvements in Bearings for Vertical Shafts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of end bearings for vertical rotary shafts, such as are employed in cream-separators, where said shafts sustain bowls, &c., of very considerable weight and rotate at a very high degree of speed, the invention being applicable more particularly to that class of separators shown in my Patent No. 547,367, dated October 1, 1895.

The objects of the present invention are to secure a more simple structure; to obtain reduced bearing-surfaces, and thus secure a more limited frictional contact of the working parts; to enable the wear in the shaft and said working parts to be taken up with greater exactness, convenience, and ease, and to secure other advantages and results, some of which may be referred to hereinafter in connection with the description of the working parts.

The invention consists in the improved end bearings or supporting bearings for a vertical rotary shaft and in the arrangements and combinations of parts thereof, all substantially as will be hereinafter set forth, and finally embraced in the clauses of the claim.

Referring to the accompanying drawings, in which like letters of reference indicate corresponding parts in each of the views, Figure 1 is a central vertical section of a portion of a cream-separating machine having a rotary shaft and bearings therefor. Fig. 2 is a section of the same, taken on line $x$. Fig. 3 is a vertical section similar to that shown in Fig. 1, showing a modification of construction; and Fig. 4 is a section of the same on line $y$.

In said drawings, $a$ indicates a suitable frame or bed-plate of the machine in which the working parts of my invention are seated, and $b$ indicates the rotary shaft arranged vertically in said machine and seated at its lower end on the bearings embodying my invention. Said frame or bed-plate $a$ is provided at its bottom with a cup-shaped receptacle $p$, which may be integral with the said frame or be adjustable in relation thereto, and which is provided with a ball-socket $p'$ at its upper part above the oil-chamber $p''$. In said receptacle $p$ is arranged a sleeve $q$, which at its upper end is somewhat globular or ball shaped to enter the socket $p'$ and engage the sides thereof and turn therein after the fashion of an ordinary ball-bearing in its socket. Said sleeve $q$ is centrally bored out to receive the reduced lower end $b'$ of the shaft. The said reduced lower end is provided with a spiral oil-groove $b''$, by which the lubricating-oil is raised from the chamber $p''$ up to certain upper ball or roller bearings arranged in an annular groove at the upper end of the sleeve $q$ or a bearing-piece $d$, of hardened steel, supplementing the same, the oil being circulated around and between said bearings copiously and with considerable freedom. On said shaft $b$ is arranged a pulley $s$, suitably grooved or otherwise formed to receive a driving-belt, (not shown,) said pulley being fixed to the shaft by means of a conical shoulder $t$ on the shaft driven into a correspondingly-shaped center opening in the pulley, or the parts can be joined in any suitable manner. In lieu of a belt-pulley any other suitable gearing for transmitting power common to mechanics may be employed—such, for example, as a worm-wheel, a cog-wheel, a friction-wheel, or the like.

The shaft $b$, seated in bearings in the pulley, as described, is removable therefrom without disturbing said pulley in its relation to its supporting devices, and thus the bowl or other device operated by said shaft may be removed therewith with facility and ease for purposes of cleansing, &c.

In the under side of the pulley $s$ the same is quite deeply recessed or a depending annular flange $f$ is formed at said under side, and in the recess $e$ is arranged a washer $v$, adapted to support the weight of the pulley $s$, and the shaft $b$, seated therein and to rest on balls $w$ or, as a modification, upon the rollers $w'$, as indicated in Fig. 3.

A receptacle $u$ for grit or metallic particles is formed in the inside walls of the flange, into which the said grit or metallic particles, being heavy, are forced as the lubricant flows downward after having been elevated by the spiral shaft end, the said lubricant being thus maintained in a state of purity, so that it may be employed repeatedly without a reduction in its lubricating power or capacity.

To take up the wear on the bearings, I provide an adjustable piece $p'''$, which is screw-threaded to engage correspondingly-threaded bearings 5. In Fig. 1 this adjustable piece $p'''$ is the part $p$ of the frame $a$, having the oil-chamber $p''$ and socket $p'$, the body of the frame $a$ in this case being perforated through the bottom and threaded to receive the said adjustable piece $p'''$ from below, so that by simply turning said piece $p'''$ within the threaded bearings 5 of the frame $a$ said piece $p'''$ will be raised or lowered, and with it the several parts supported thereby. In Fig. 3 said adjustable piece consists of a cap-like part $d'$ interiorly threaded and engaging a correspondingly-threaded upper end of the sleeve $q$, in which latter case by simply turning the said piece upon the said sleeve the wear will be taken up, as will be understood. I prefer the former construction, inasmuch as I am able to take up the wear by simply turning the adjustable piece from beneath the frame $a$ without removing the operating parts from their bearings or disturbing the other adjustments in the machine. I prefer to employ a lock-nut $o$, Fig. 1, to prevent the adjustable pieces $p$ from being thrown from proper adjustment while the machine is in operation.

To prevent free rotation of the sleeve $q$ with the shaft $b$, I prefer to fix a pin, lug, or projection $q'$ on the globular surface of said sleeve, which projection extends into a slot $g$ in the adjacent walls of the frame, the slot being of sufficient size to permit sufficiently the desired freedom of the ball action.

Above the pulley I arrange a keeper-bracket $h$, adapted to loosely receive an extension $s'$ of the pulley, so as to hold said pulley and the parts beneath the same in proper relative position after the shaft $b$ is lifted from said pulley in washing the bowl or for other purposes.

Having thus described the invention, what I claim as new is—

1. The combination with the frame $a$, having a socket $p'$ and a shaft having a reduced lower end forming a shoulder, of a pulley arranged around said shaft and supporting the same, a sleeve having a globular portion arranged in said socket and at its upper end having annular bearings and rollers interposed between the said annular bearings and the pulley and supporting the latter, substantially as set forth.

2. The combination with the frame $a$, having a socket and oil-receptacle, of a sleeve arranged in said oil-receptacle and supported in said socket and having bearings for balls $w$, a pulley seated on said balls and a shaft seated in said pulley and vertically removable therefrom and extending down into said sleeve, and oil-receptacle, substantially as set forth.

3. The combination with the frame $a$, having a socket of a sleeve having a globular part fitting said socket and having bearings for balls $w$, a pulley seated on said balls, the latter being interposed between the pulley and sleeve and a shaft seated in said pulley and extending into said sleeve, substantially as set forth.

4. The combination with the frame having an oil-receptacle, of a sleeve seated in said receptacle and having bearings for balls $w$, at its upper end, said balls and pulley seated thereon, and a shaft seated on said pulley and having a reduced and spirally-threaded end extending into said sleeve and oil-receptacle, substantially as set forth.

5. The combination with the frame $a$, having a threaded receptacle arranged adjustably therein, said receptacle having bearings at its upper end for a sleeve, of said sleeve, balls $w$, arranged on said sleeve, a pulley arranged on said balls and a shaft supported by said pulley and extending into said sleeve and adapted to be raised or lowered by said threaded receptacle, substantially as set forth.

6. The combination with the frame perforated from the bottom and provided with a vertically-adjustable receptacle for oil, of a sleeve bearing on the said receptacle, rollers, a pulley and a reduced and spirally-grooved shaft, extending through said pulley and sleeve into said receptacle, substantially as set forth.

In testimony that I claim the foregoing I have hereunto set my hand this 28th day of September, 1897.

OSCAR ANDERSON.

Witnesses:
CHARLES H. PELL,
C. B. PITNEY.